(12) United States Patent
Kikinis

(10) Patent No.: US 8,438,594 B1
(45) Date of Patent: May 7, 2013

(54) METHOD AND SYSTEM FOR 3-D ENHANCED ADVERTISING FOR TV BROADCAST OF 2-D VIDEO

(75) Inventor: Dan Kikinis, Saratoga, CA (US)

(73) Assignee: JLB Ventures LLC, Washington, DC (US)

( * ) Notice: Subject to any disclaimer, the term of this patent is extended or adjusted under 35 U.S.C. 154(b) by 2247 days.

(21) Appl. No.: 09/782,896

(22) Filed: Feb. 13, 2001

Related U.S. Application Data

(60) Provisional application No. 60/203,496, filed on May 11, 2000.

(51) Int. Cl.
   *H04N 7/10* (2006.01)
   *H04N 7/025* (2006.01)
   *G06T 15/00* (2011.01)
   *G06T 15/10* (2011.01)
   *G06T 15/20* (2011.01)

(52) U.S. Cl.
   USPC ................. 725/32; 345/419; 345/427

(58) Field of Classification Search ............ 725/32, 725/34–36; 345/647, 646
   See application file for complete search history.

(56) References Cited

U.S. PATENT DOCUMENTS

| | | |
|---|---|---|
| 4,621,259 A | 11/1986 | Schepers et al. |
| 5,243,418 A | 9/1993 | Kuno et al. |
| 5,264,933 A * | 11/1993 | Rosser et al. ............. 348/578 |
| 5,414,773 A | 5/1995 | Handelman |
| 5,479,268 A | 12/1995 | Young et al. |
| 5,526,034 A | 6/1996 | Hoarty et al. |
| 5,532,754 A | 7/1996 | Young et al. |
| 5,550,576 A | 8/1996 | Klosterman |
| 5,550,578 A | 8/1996 | Hoarty et al. |
| 5,684,525 A | 11/1997 | Klosterman |
| 5,704,837 A | 1/1998 | Iwasaki et al. |
| 5,737,028 A | 4/1998 | Bertram et al. |
| 5,751,282 A | 5/1998 | Girard et al. |
| 5,808,613 A | 9/1998 | Marrin et al. |
| 5,818,441 A | 10/1998 | Throckmorton et al. |
| 5,828,945 A | 10/1998 | Klosterman |
| 5,841,563 A | 11/1998 | Effenberger |
| 5,861,905 A | 1/1999 | Brummett |
| 5,900,915 A | 5/1999 | Morrison |
| 5,903,673 A | 5/1999 | Wang et al. |
| 5,923,362 A | 7/1999 | Klosterman |
| 5,926,168 A | 7/1999 | Fan |
| 5,929,849 A | 7/1999 | Kikinis |
| 5,940,073 A | 8/1999 | Klosterman et al. |
| 5,956,456 A | 9/1999 | Bang et al. |

(Continued)

FOREIGN PATENT DOCUMENTS

| | | |
|---|---|---|
| JP | 410093880 A | 4/1998 |
| WO | WO 00/01149 A1 | 1/2000 |

*Primary Examiner* — Pankaj Kumar
*Assistant Examiner* — Usha Raman
(74) *Attorney, Agent, or Firm* — Banner & Witcoff, Ltd.

(57) ABSTRACT

A method and system for 3-D enhanced advertising for TV broadcast of 2-D video is disclosed. In one embodiment, a method for providing enhanced advertising of a 2-D video broadcast, comprises receiving the 2-D video broadcast containing a 2-D advertisement having an image. The image is identified within the advertisement. A matching 3-D object in an image library is used; wherein the library comprises one or more 3-D objects. The matching 3-D object is used to generate an advertisement, wherein the advertisement has a 3-D highlighted rendering of the image.

19 Claims, 5 Drawing Sheets

U.S. PATENT DOCUMENTS

| | | |
|---|---|---|
| 5,999,167 A | 12/1999 | Marsh et al. |
| 5,999,187 A | 12/1999 | Dehmlow et al. |
| 6,002,403 A | 12/1999 | Sugiyama et al. |
| 6,029,195 A | 2/2000 | Herz |
| 6,034,678 A | 3/2000 | Hoarty et al. |
| 6,035,412 A | 3/2000 | Tamer et al. |
| 6,061,055 A | 5/2000 | Marks |
| 6,072,983 A | 6/2000 | Klosterman |
| 6,075,575 A | 6/2000 | Schein et al. |
| 6,078,348 A | 6/2000 | Klosterman et al. |
| 6,081,271 A | 6/2000 | Bardon et al. |
| 6,100,883 A | 8/2000 | Hoarty |
| 6,167,188 A | 12/2000 | Young et al. |
| 6,205,485 B1 | 3/2001 | Kikinis |
| 6,205,582 B1 | 3/2001 | Hoarty |
| 6,233,389 B1 | 5/2001 | Barton et al. |
| 6,243,039 B1 | 6/2001 | Elliot |
| 6,271,831 B1 | 8/2001 | Escobosa et al. |
| 6,421,067 B1 * | 7/2002 | Kamen et al. .................. 715/719 |
| 6,446,261 B1 * | 9/2002 | Rosser ............................ 725/34 |
| 6,556,196 B1 * | 4/2003 | Blanz et al. .................... 345/419 |
| 2005/0166224 A1 * | 7/2005 | Ficco .............................. 725/35 |

* cited by examiner

METHOD AND SYSTEM FOR 3-D ENHANCED ADVERTISING FOR TV BROADCAST OF 2-D VIDEO

This patent claims priority based on U.S. Provisional Patent Application Ser. No. 60/203,496, filed on May 11, 2000, incorporated herein by reference.

FIELD OF THE INVENTION

The present invention relates generally to the field of video processing systems, and, more specifically, to a method and system for 3-D enhanced advertising for TV broadcast of 2-D video.

BACKGROUND OF THE INVENTION

During the process of video and image editing, one alters portions or all of a video image, e.g. by moving an image from one portion of a screen to another, rotating the image, expanding the image or shrinking the image. Other common image manipulations include warping an image (i.e. deforming the image in three dimensions), magnifying parts of an image, performing cylindrical, spherical, hyperbolic, or parabolic transformations to the image (e.g. causing a two-dimensional image to appear to bend or wrap around a cylindrical, spherical, hyperbolic or parabolic surface), melting images, etc. Parabolic transformations may be used to provide a three dimensional (3-D) effect.

Frequently, the image to be manipulated is in the form of a pixel array. In other words, the image is stored as an array of data values, each value corresponding to the color and brightness of a small area of the image. When performing the above-mentioned video image manipulations, one typically performs calculations to transform every pixel of the image. For example, for each pixel of the image, one performs calculations to determine a new location for that pixel on a video screen. Large images can contain millions of pixels. Further, for the case of image streams (e.g. as in the case of video images), dozens of frames per second must be transformed. Thus, many millions of pixels may have to be analyzed and modified for each transformation in a very short amount of time. Such transformations require either enormous CPU resources or special hardware to be able to transform large numbers of pixels in a short amount of time.

Although some 3-D video standards are already developed and have, for example, been included in the Motion Picture Experts Group 4 (MPEG4) video standard, these standards require specialized transmission systems, players, etc., which may not be installed into common commercial video broadcasting systems for a long time.

In addition, the amount of data transmitted in real 3-D video broadcasting on a regular basis is so large that it can be overwhelming for present-day delivery systems and for systems anticipated in the near future.

SUMMARY OF THE INVENTION

A method and system for 3-D enhanced advertising for TV broadcast of 2-D video is disclosed. In one embodiment, a method for providing enhanced advertising of a 2-D video broadcast, comprises receiving the 2-D video broadcast containing a 2-D advertisement having an image. The image is identified within the advertisement. A matching 3-D object in an image library is used; wherein the library comprises one or more 3-D objects. The matching 3-D object is used to generate an advertisement, wherein the advertisement has a 3-D highlighted rendering of the image.

Other features of the present invention will be apparent from the accompanying drawings and from the detailed description, which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
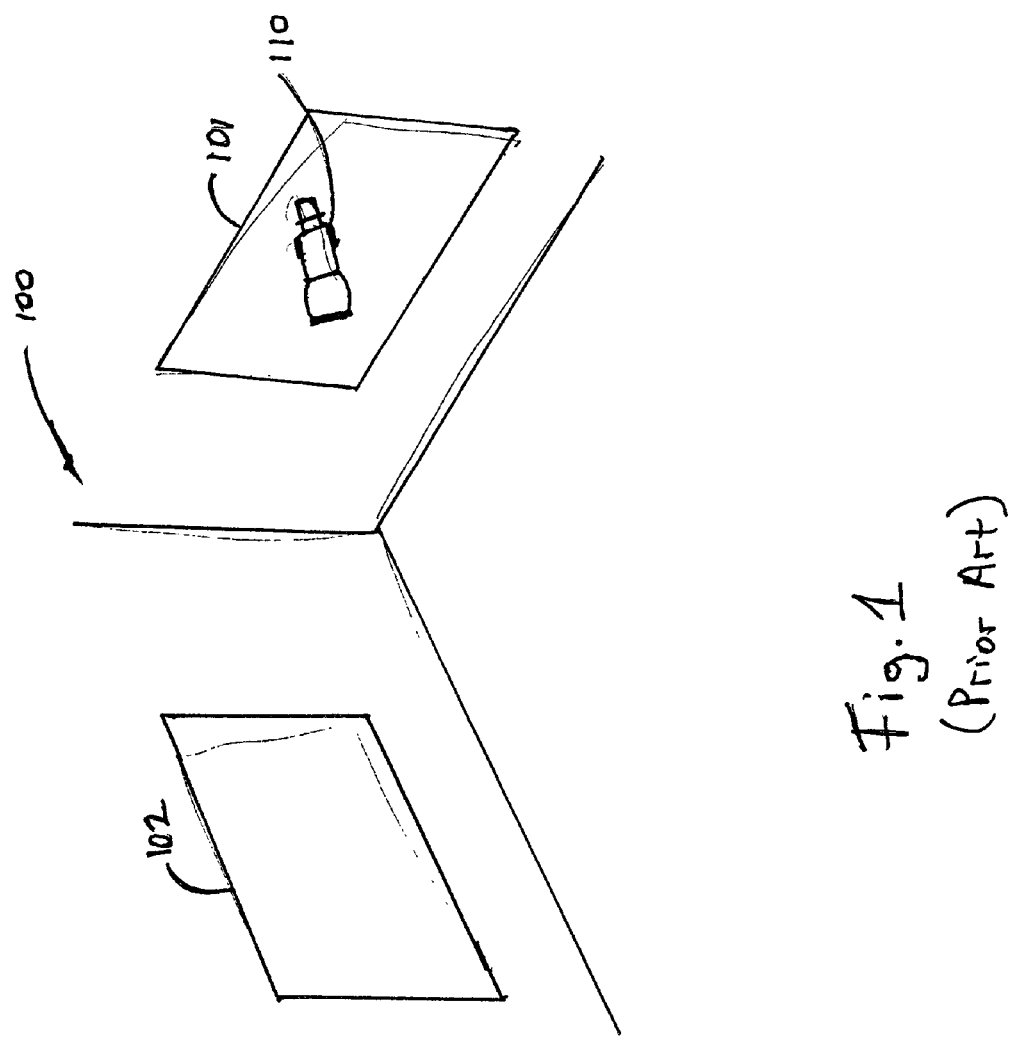
FIG. 1 illustrates an exemplary prior art 2-D advertisement display.

A method and system for 3-D enhanced advertising for TV broadcast of 2-D video, is described. In the following description, for purposes of explanation, numerous specific details are set forth in order to provide a thorough understanding of the present invention. It will be evident, however, to one skilled in the art that the present invention may be practiced without these specific details.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention. It is to be understood that other embodiments may be utilized and that logical, software, re-ordering of steps, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm as described here, is generally conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

FIG. 1 illustrates an exemplary prior art 2-D advertisement display. More specifically, FIG. 1 shows a pseudo 3-D view of a split screen in virtual room 100 with two screens 101 and 102 as flat geometric surfaces suspended on the walls of the room.

On screen 101 an advertisement for Coca Cola, for example, is running, with Coke bottle 110 visible. Even though this is a virtual 3-D world, because the video source is a 2-D source, virtual screen 101, is essentially flat or slightly cylindrical, and displays a simple object. Although one of ordinary skill in the art may use color information, etc., to derive a Z component for such a flat object, the results could be rather strange in some cases, because color can change with the lighting when advertisements are video taped. Typically, such advertisements may have enhanced special lighting effects, which in such cases can result in very strange deformations of the object.

Figure 2:
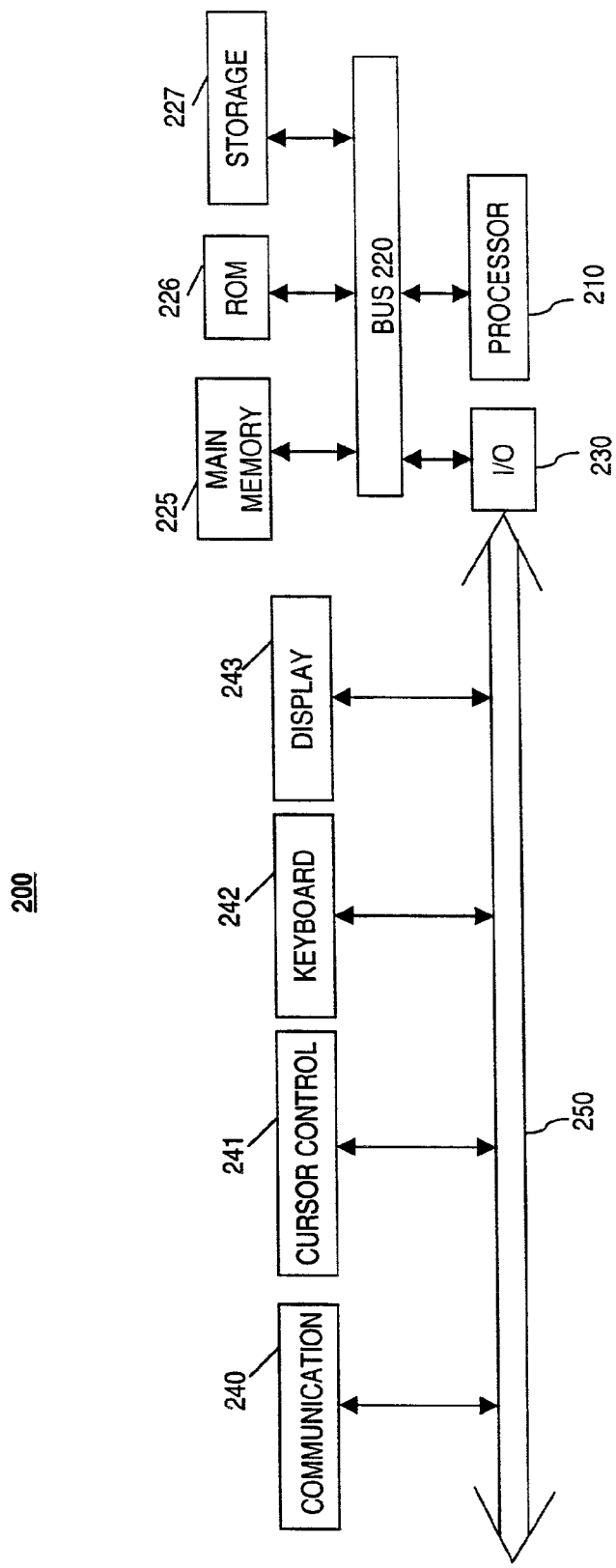
FIG. 2 illustrates an exemplary computer architecture 200 used to implement the present 3-D enhanced advertising method.

FIG. 2 illustrates an exemplary computer architecture 200 used to implement the present 3-D enhanced advertising method. Architecture 200 represents an integrated multi-processor, in which elements of the present method and system for providing 3-D enhanced advertising may be implemented. Architecture 200 may be a set top box, computer, or similar device. One embodiment of computer architecture 200 comprises a system bus 220 for communicating information, and a processor 210 coupled to bus 220 for processing information. Computer architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer architecture 200 for storing information and instructions. Computer architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). Display device 243 may be a television, computer monitor, or liquid crystal display. The input device may also include a keyboard, mouse, trackball, or remote controller.

The communication device 240 is for accessing other computers via a network. The communication device 240 may comprise a modem, a network interface card, or other well known interface device, such as those used for coupling to Ethernet, token ring, or other types of networks, including the internet.

Figure 3:
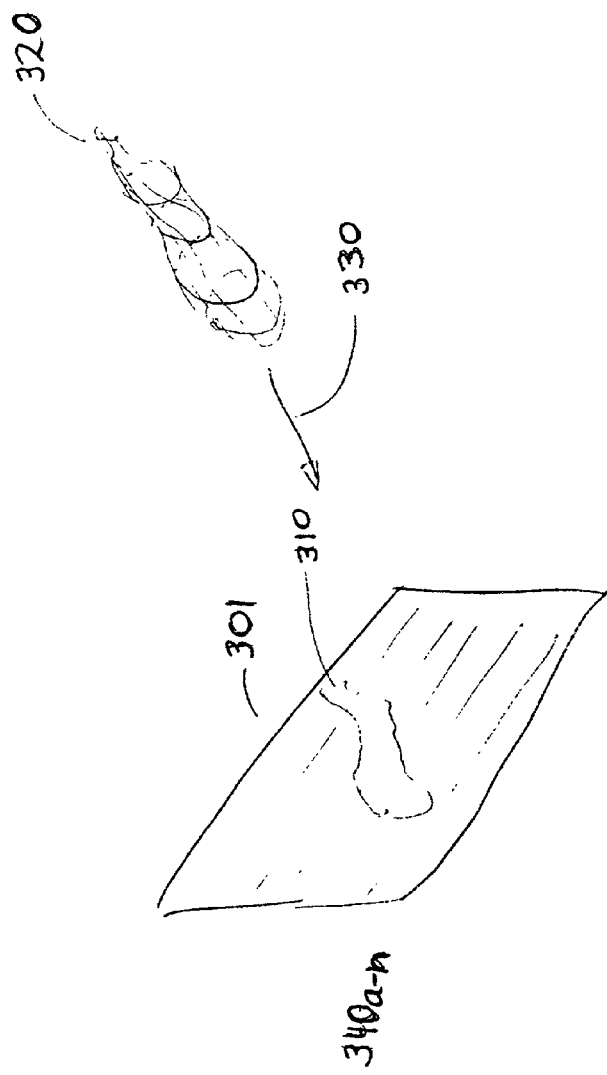
FIG. 3 illustrates an exemplary approach to the present method.

FIG. 3 illustrates an exemplary approach to the present method. Screen 301 is shown with Coke bottle 310 on it. Screen 301 is flat and rectangular in one embodiment. However in alternate embodiments screen 301 may be a different shape and contoured. For example, screen 301 may have a cylindrical or spherical warp to it, or it may be wrapped onto some other object, such as a column, but essentially the surface is similar to a flat sheet of paper. Also, a limited number of horizontal grid lines 340 a through n are symbolized, which go straight through Coke bottle 310, indicating that the image of the bottle 310 is a flat geometric surface. Gridlines 340 a-n may not be visible to a viewer.

In addition, a web link may be incorporated into the Coke bottle to display additional information to allow the viewer to surf to a local shopping outlet. As the ad is playing, this link may, for example, also be used to identify object 310 in the ad and to refer to a look-up table to see if there is a 3-D object corresponding to object 310 in a library that is local in the viewer's set-top box, or computer having an architecture 200. That library may be broadcast to all set-top boxes on the broadcasting system on a regular basis and updated, or it may be loaded over the Internet or any other type of network connection including all known caching and buffering techniques.

3-D object 320 has a matching ID to coke bottle 310. In a visualized form, object 320 may be pushed with arrow 330 into flat geometric surface 301 so as to deform it.

Figure 4:
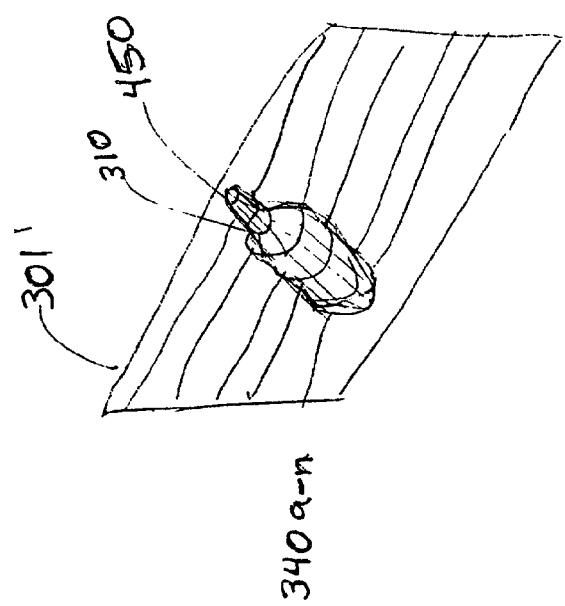
FIG. 4 illustrates an exemplary advertisement display having a 3-D highlighted rendering.

FIG. 4 illustrates an exemplary advertisement display having a S-D highlighted rendering. FIG. 4 shows the resulting deformation that has a half Coke bottle pushed out of the flat geometric surface into shape 450 shown in the deformation of grid lines 340 a through n on surface 301'.

Still overlaid on the correct location is the image of actual Coke bottle 310, so the video image is preserved, and by overlaying shades and specular lighting, the visual enhancement of the object can heightened.

As a result, it is possible to create a visual impression that makes the advertised object appear to be practically jumping out of the screen at the viewer.

Figure 5:
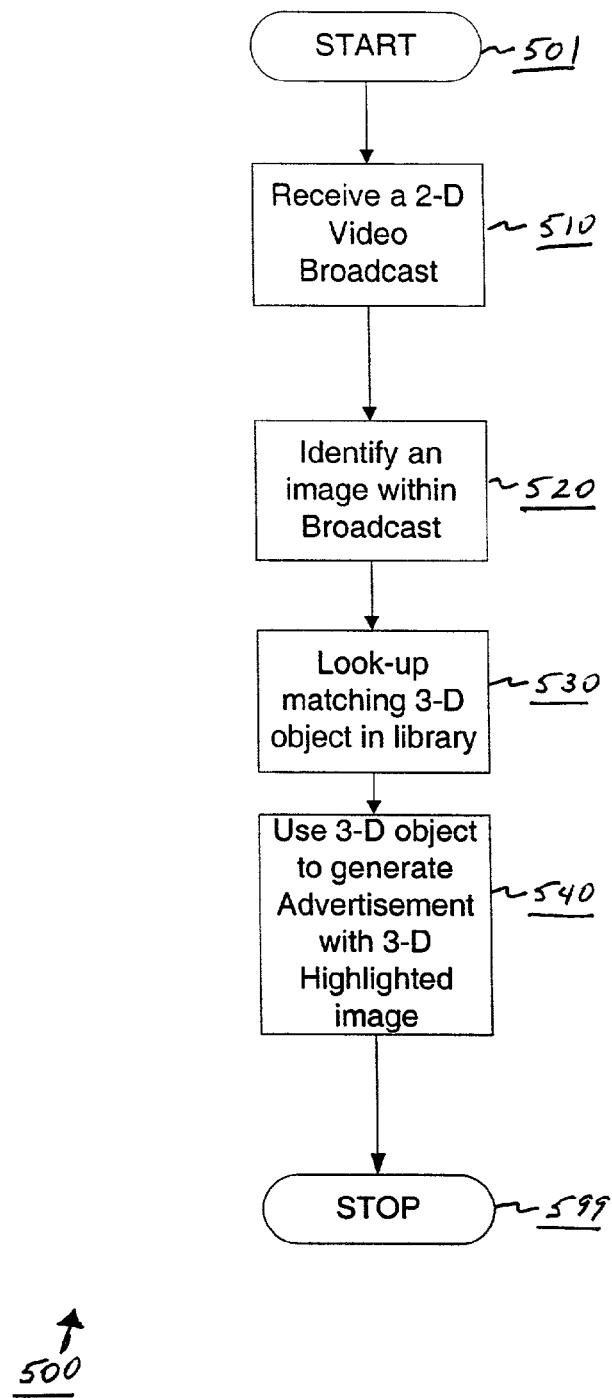
FIG. 5 illustrates an exemplary flow diagram of the process performed by architecture 200 for providing 3-D enhanced advertising.

FIG. 5 illustrates an exemplary flow diagram of the process performed by architecture 200 for providing 3-D enhanced advertising. The process starts at block 501. At processing block 510, architecture 200 receives a 2-D video broadcast. The video broadcast contains a 2-D advertisement in which there is at least one 2-D image. The advertisement may be for Coca-Cola and the 2-D image may be a coke bottle 310.

Flow continues to processing block 520, where architecture 200 identifies the images within the 2-D video advertisement broadcast. At processing block 530, architecture 200 look-up a 3-D object in a library that matches the image 310. The library may contain one or more 3-D objects and be stored in storage 227.

At processing block 540 architecture 200 uses the matching 3-D object to generate an advertisement. The advertisement may have a 3-D highlighted rendering of the original 2-D image. One of ordinary skill in the art may be able to render such an image, as described in co pending application Ser. No. 09/344,442 filed on Jun. 25, 1999, now U.S. Pat. No. 6,342,884, entitled "Method and Apparatus for Using a General Three-Dimensional (3D) Graphics Pipeline for Cost Effective Digital Image and Video Editing, Transformation, and Representation" by Yakou Kamen and Leon Shirmar. The 3-D image rendered may contain specular lighting and shading. The resulting advertisement may be displayed by architecture 200 by a display 243, such as a television or monitor. The process ends at block 599.

Thus, a method and system for the method and system for 3-D enhanced advertising for TV broadcast of 2-D video have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for providing enhanced advertising of a 2-D broadcast, comprising:
   receiving the 2-D video broadcast including an advertisement having a 2-D image;
   identifying the 2-D image within the advertisement, wherein the 2-D image is identified based on one or more characteristics of the 2-D image and exclusively at a viewer's equipment;
   looking-up a matching 3-D object in an image library using a look-up table, wherein the library comprises one or more 3-D objects; and
   using the matching 3-D object to generate an enhanced advertisement, wherein the enhanced advertisement has a 3-D highlighted rendering of the image produced by pushing the 3-D object into the 2-D image, and further wherein said 3-D highlighted rendering of the image comprises a portion of the original 2-D image and said 3-D object.

2. The method according to claim 1, wherein the advertisement includes a plurality of 2-D images.

3. The method according to claim 1, further comprising displaying the enhanced advertisement on a display device, the display device comprising at least one of: a television, a computer monitor, and liquid crystal display.

4. The method of claim 3, further comprising overlaying the 2-D image on the matching 3-D object.

5. The method of claim 4, wherein overlaying the image further comprises:
   overlaying specular lighting; and
   overlaying shading.

6. A system for providing enhanced advertising of a 2-D video broadcast, comprising:
   means for receiving the 2-D video broadcast including an advertisement having a 2-D image;
   means for identifying the 2-D image within the advertisement, wherein said 2-D image is identified based on one or more characteristics of the 2-D image and exclusively at a viewer's equipment;
   means for looking-up a matching 3-D object in an image library, wherein the library comprises one or more 3-D objects; and
   means for using the matching 3-D object to generate an enhanced advertisement, wherein the enhanced advertisement has a 3-D highlighted rendering of the image produced by pushing the 3-D object into the original 2D image, and further wherein said 3-D highlighted rendering of the image comprises a portion of the original 2-D image and said 3-D object.

7. The system according to claim 6, wherein the advertisement includes a plurality of 2-D images.

8. The system according to claim 6, further comprising means for displaying the enhanced advertisement on a display device, the display device comprising at least one of: a television, a computer monitor, and a liquid crystal display.

9. The system according to claim 8, further comprising means for overlaying the 2-D image on the matching 3-D object.

10. The system according to claim 9, wherein means for overlaying the image further comprises:
    means for overlaying specular lighting; and
    means for overlaying shading.

11. A non-transitory computer readable medium having stored thereon a plurality of instructions for providing enhanced advertising of a 2-D broadcast, said plurality of instructions when executed by an apparatus, cause said apparatus to perform:
    receiving the 2-D video broadcast including an advertisement having a 2-D image;
    identifying the 2-D image within the advertisement, wherein the 2-D image is identified solely based on one or more characteristics of the 2-D image and exclusively at a viewer's equipment;
    looking-up a matching 3-D object in an image library using a look-up table, wherein the library comprises one or more 3-D objects; and
    using the matching 3-D object to generate an enhanced advertisement, wherein the enhanced advertisement has a 3-D highlighted rendering of the image produced by pushing the 3-D object into the original 2-D image.

12. The non-transitory computer readable medium of claim 11, wherein the advertisement includes a plurality of 2-D images.

13. The non-transitory computer readable medium of claim 11 having stored thereon additional instructions, said additional instructions when executed by the apparatus, cause said apparatus to further perform displaying the enhanced advertisement on a display device, the display device comprising at least one of: a television, a computer monitor, and a liquid crystal display.

14. The non-transitory computer readable medium of claim 13 having stored thereon additional instructions, said additional instructions when executed by the apparatus, cause said apparatus to further perform overlaying the 2-D image on the matching 3-D object.

15. The non-transitory computer readable medium according to claim 14, having stored thereon additional instructions, said additional instructions when executed by the apparatus, cause said apparatus to further perform overlaying the image by:
   overlaying specular lighting; and
   overlaying shading.

16. A set-top box for generating 3-D enhanced advertising from 2-D video broadcasts, comprising:
   a processor; and
   a storage device, wherein the storage device is configured to store a library of 3-D objects;
   wherein the processor is configured to:
   receive a 2-D broadcast including an advertisement having a 2-D image;
   identify the 2-D image within the advertisement, wherein said 2-D image is identified based on its characteristics and exclusively at a viewer's equipment;
   look-up a 3-D object matching the 2-D image in the library; and
   use the matching 3-D object to generate an enhanced advertisement, wherein the enhanced advertisement has a 3-D highlighted rendering of the image produced by pushing the 3-D object into the original 2-D image, and further wherein said 3-D highlighted rendering of the image comprises a portion of the original 2-D image and said 3-D object.

17. The set top box of claim 16, wherein the advertisement includes a plurality of 2-D images.

18. The set top box of claim 17 wherein the processor uses a look-up table to identify the matching 3-D object.

19. The set top box of claim 18, further comprising a display device that displays the enhanced advertisement, wherein the display device comprises at least one of: a television, a computer monitor, and a liquid crystal display.

* * * * *